(12) United States Patent
Ishii et al.

(10) Patent No.: US 12,211,476 B2
(45) Date of Patent: Jan. 28, 2025

(54) VIBRATION DAMPING AND SOUND INSULATING DEVICE

(71) Applicant: MITSUBISHI HEAVY INDUSTRIES, LTD., Tokyo (JP)

(72) Inventors: Yuki Ishii, Tokyo (JP); Takaki Sato, Tokyo (JP); Yusei Kashizaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 236 days.

(21) Appl. No.: 17/918,687

(22) PCT Filed: Feb. 9, 2021

(86) PCT No.: PCT/JP2021/004739
§ 371 (c)(1),
(2) Date: Oct. 13, 2022

(87) PCT Pub. No.: WO2021/215079
PCT Pub. Date: Oct. 28, 2021

(65) Prior Publication Data
US 2023/0143757 A1 May 11, 2023

(30) Foreign Application Priority Data
Apr. 20, 2020 (JP) ................................. 2020-074636

(51) Int. Cl.
*G10K 11/172* (2006.01)
*F16F 15/04* (2006.01)

(52) U.S. Cl.
CPC ............ *G10K 11/172* (2013.01); *F16F 15/04* (2013.01)

(58) Field of Classification Search
CPC ............................... G10K 11/172; F16F 15/04
(Continued)

(56) References Cited

U.S. PATENT DOCUMENTS

| 2,541,159 A | * | 2/1951 | Geiger | ..................... E04B 1/84 |
| | | | | 181/208 |
| 7,395,898 B2 | * | 7/2008 | Yang | ................... G10K 11/172 |
| | | | | 181/286 |

(Continued)

FOREIGN PATENT DOCUMENTS

JP H08-50489 A 2/1996
JP 2008-215064 A 9/2008
(Continued)

OTHER PUBLICATIONS

International Search Report of PCT/JP2021/004739 dated Apr. 6, 2021 (9 pages).

(Continued)

*Primary Examiner* — Jeremy A Luks
(74) *Attorney, Agent, or Firm* — Osha Bergman Watanabe & Burton LLP (57) ABSTRACT

A vibration damping and sound insulating device installed on an installation object, includes: vibrators disposed at a prescribed spacing. Each of the vibrators includes: a cylindrical tubular member on the installation object; an elastic body supported by the cylindrical tubular member such that the elastic body traverses a hollow portion of the cylindrical tubular member along a direction orthogonal to an axis of the cylindrical tubular member; and a weight on the elastic body.

9 Claims, 6 Drawing Sheets

(58) Field of Classification Search
USPC .................................................. 181/207, 208
See application file for complete search history.

(56) References Cited

U.S. PATENT DOCUMENTS

| | | | |
|---|---|---|---|
| 8,616,330 B1* | 12/2013 | McKnight | B60R 13/08 |
| | | | 181/207 |
| 8,752,667 B2* | 6/2014 | McKnight | G10K 11/172 |
| | | | 181/207 |
| 9,711,129 B2* | 7/2017 | Sheng | G10K 11/162 |
| 11,021,870 B1* | 6/2021 | McKnight | E04B 1/84 |
| 2011/0240402 A1* | 10/2011 | Chou | F16F 15/04 |
| | | | 181/207 |
| 2018/0082668 A1* | 3/2018 | Yamazoe | G10K 11/16 |
| 2018/0340328 A1 | 11/2018 | Koga et al. | |
| 2019/0035373 A1* | 1/2019 | Chunren | G10K 11/162 |

FOREIGN PATENT DOCUMENTS

| | | |
|---|---|---|
| JP | 2010-26258 A | 2/2010 |
| JP | 2014-182205 A | 9/2014 |
| JP | 2019-12205 A | 1/2019 |
| WO | 2016-208534 A1 | 12/2016 |
| WO | 2017-135409 A1 | 8/2017 |

OTHER PUBLICATIONS

International Preliminary Report on Patentability mailed on Nov. 3, 2022 in corresponding International (PCT) Application No. PCT/JP2021/004739 (12 pages).

\* cited by examiner

VIBRATION DAMPING AND SOUND INSULATING DEVICE

TECHNICAL FIELD

The present disclosure relates to a vibration damping and sound insulating device installed on an installation object such as a sound insulating material.

This application claims the priority of Japanese Patent Application No. 2020-074636 filed on Apr. 20, 2020, the content of which is incorporated herein by reference.

BACKGROUND

For example, in an aircraft, the space, a plant, a generator, a ship, or a vehicle, a sound insulation wall or a cover is used as countermeasures against acoustic excitation or noise. In general, a sound transmission loss in a sound insulating material increases as the surface density ($kg/m^2$) increases or as the frequency of sound increases (mass law). Thus, in order to enhance a sound insulation effect when it is desired to insulate sound having a certain frequency (vibration frequency), it is necessary to increase the weight of the sound insulation wall, the cover, or the like. However, there is a limit on the increase in weight due to restrictions imposed by each product or the like, and it tends to be difficult to obtain the sound insulation effect, especially in a low frequency range.

To address such problem, Patent Document 1 discloses a sound insulating sheet member which is relatively light in weight and has high sound insulation performance exceeding mass law. The sound insulating sheet member includes a sheet having rubber elasticity and a plurality of resonant portions disposed on the sheet. Each resonant portion includes a base part working as a spring with a shape such as a cylindrical shape and a weight part supported by the base part, and functions as a resonator that has a resonance frequency determined by the mass of the weight part and the spring constant of the base part. Further, in addition to being arranged, on the sheet, at an equal interval in a matrix form, the plurality of the resonant portions may be arranged in a staggered manner or at random, and do not necessarily have to be arranged at a regular and periodic interval.

CITATION LIST

Patent Literature

Patent Document 1: WO2017/135409A

SUMMARY

Technical Problem

As a result of intensive researches, the present inventors have found a method capable of more effectively performing vibration damping and sound insulation on sound having a desired frequency to be insulated, while suppressing an increase in weight of a sound insulating material such as a sound insulation wall or a cover. For example, in the sound insulating sheet member disclosed in Patent Document 1, since the base part disposed on the sheet works as the spring, the base part can be deformed in various directions such as the vertical direction, a bending direction, and a twisting direction. Thus, although a plurality of vibration modes may appear in the sound insulation wall or the like, according to the method of the present inventors, it is possible to improve sound insulation performance by more effectively suppressing the vibration of the sound insulation wall or the like caused by desired sound.

In view of the above, an object of at least one embodiment of the present disclosure is to provide a vibration damping and sound insulating device capable of improving sound insulation performance while suppressing an increase in weight.

Solution to Problem

A vibration damping and sound insulating device according to at least one embodiment of the present invention is a vibration damping and sound insulating device installed on an installation object, which includes at least one vibrator. The vibrator includes: a cylindrical tubular member installed on the installation object; an elastic body supported by the tubular member so as to traverse a hollow portion of the tubular member along an orthogonal direction orthogonal to an axis of the tubular member; and a weight installed on the elastic body.

Advantageous Effects

According to at least one embodiment of the present disclosure, a vibration damping and sound insulating device is provided which is capable of improving sound insulation performance while suppressing an increase in weight.

DETAILED DESCRIPTION

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

Figure 1:
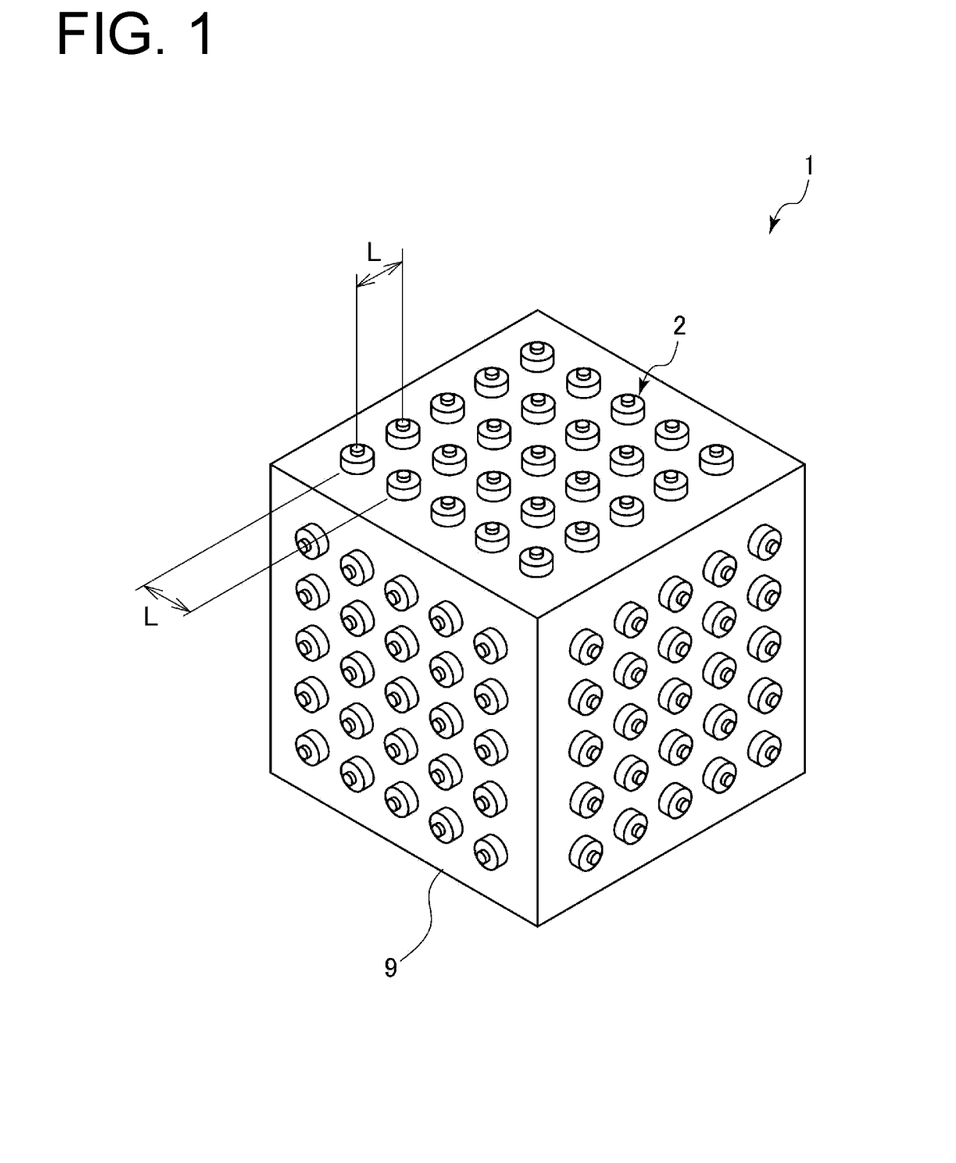
FIG. 1 is a view showing an installation example of a vibration damping and sound insulating device including a plurality of vibrators on an installation object according to at least one embodiment of the present disclosure.
Figure 2:
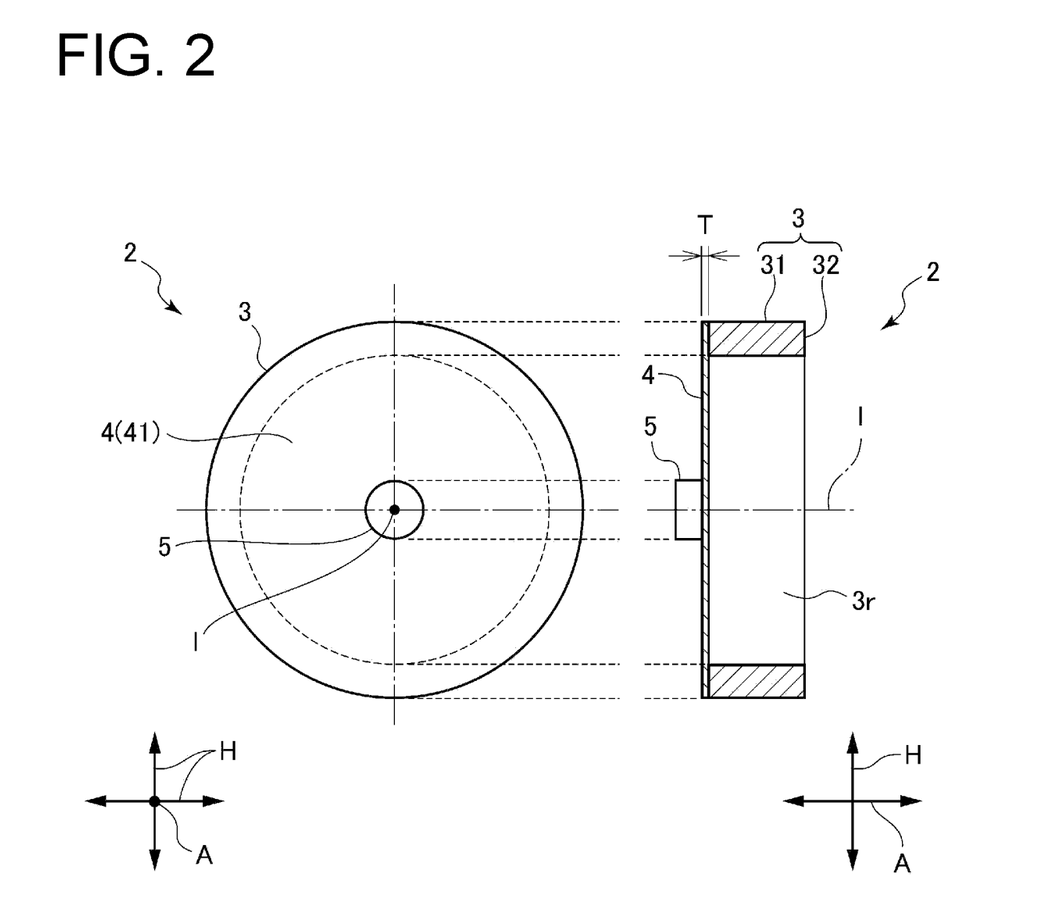
FIG. 2 shows schematic configuration views of the vibrator according to at least one embodiment of the present disclosure, where an elastic body is a thin plate.

FIG. 1 is a view showing an installation example of a vibration damping and sound insulating device 1 including a plurality of vibrators 2 on an installation object 9 according to at least one embodiment of the present disclosure. FIGS. 2 to 6 each show schematic configuration views of the vibrator 2 according to at least one embodiment of the present disclosure. In each of FIGS. 2 to 6, a left section is a plan view and a right section is a cross-sectional view along an axis direction A. The above-described axis direction A is a direction along an axis 1 of a tubular member 3 which will be described later. Assuming that a direction intersecting the axis direction A is called an orthogonal direction H, the axis 1 of the tubular member 3 is a virtual line which passes through the center (center of gravity) of a cross section obtained when the tubular member 3 (described later) is cut at any position along the orthogonal direction H (hereafter, simply referred to as a cross section), and extends along the axis direction A. Hereinafter, the vibration damping and sound insulating device 1 will be described according to this definition.

The vibration damping and sound insulating device 1 is a device capable of reducing a vibration or sound of the installation object 9 by being installed on the installation object 9, for example, as shown in FIG. 1. The vibration damping and sound insulating device 1 is installed on the installation object 9 in order to insulate sound passing through the installation object 9 and propagating in air from a sound source or to reduce sound which is caused by resonance due to interference of bending waves propagating in the installation object 9 in various directions. The installation object 9 is an object on which the vibration damping and sound insulating device 1 is installed, and may be, for example, a sound insulation wall or a cover used for countermeasures against acoustic excitation or noise in, for example, an aircraft, the space, a plant, a generator, a ship, or a vehicle.

The installation object 9 shown in FIG. 1 is assumed to be a cover member for surrounding the sound source, and has a cubic shape formed by combining five plate members for surrounding the top and the periphery, inside of which the sound source exists. That is, the installation object 9 of FIG. 1 has a role of insulating sound propagating from the inside to the outside. In the example of FIG. 1, the plurality of vibrators 2 are installed on each of surfaces (in FIG. 1, five surfaces excluding one surface placed on the ground) of the installation object 9. The installation object 9 is made of aluminum and has a plate thickness of 1 mm and a side of 50 cm, but may be a large object having several meter to several tens of meter orders.

As shown in FIG. 1, the vibration damping and sound insulating device 1 includes at least one vibrator 2, for example, includes the plurality of vibrators 2 installed on the installation object 9. As shown in FIGS. 2 to 6, the vibrator 2 includes the cylindrical tubular member 3 installed on the installation object 9, an elastic body 4 supported by the tubular member 3 so as to traverse a hollow portion $3r$, which is formed by walls forming a cylindrical shape (tubular walls 31), along the direction orthogonal to the axis 1 of the tubular member 3 (orthogonal direction H) in the tubular member 3, and a weight 5 installed on the elastic body 4.

The above-described tubular member 3 is a member for installing the elastic body 4, on which the weight 5 is installed, on the installation object 9 in a state where the elastic body 4 can elastically be deformed according to incident sound or applied vibration. The tubular member 3 may be made of either a resin or metal, but the tubular member 3 itself is not configured to elastically be deformed by the incident sound or the applied vibration. In other words, the tubular member 3 has higher rigidity than the elastic body 4 and has a role of transmitting the vibration of the installation object 9 to the elastic body 4 with the weight 5.

The above-described elastic body 4 is a member that can elastically be deformed such that the elastic body 4 expands, contracts, or deflects (bends) due to a force (vibration) applied from the outside and returns to its original shape once the force is removed, and has a role of a spring. Further, the weight 5 has a role of adjusting the natural frequency of the elastic body 4 installed on the tubular member 3. The weight 5 can have any shape, and may have a cylindrical shape, a cubic shape, or the like, or may be solid or hollow.

The natural frequency of the elastic body 4 on which the weight 5 is installed is tuned by, for example, adjusting a thickness T or an area of the elastic body 4, a weight of the weight 5, or the like so that the natural frequency corresponds to the frequency (vibration frequency; the same applies hereinafter) of sound to be insulated, in a state where the elastic body 4 is supported by the tubular member 3. More specifically, the elastic body 4 on which the weight 5 is installed is adjusted to have the natural frequency within a predetermined range including the vibration frequency of the sound to be insulated. The predetermined range is a range in which the elastic body 4 with the weight 5 resonates with the sound to be insulated.

Thus, for example, in case where a vibration mode occurs in which the whole of the installation object 9 vibrates if the vibrator 2 is not installed, the vibration of the installation object 9 is reduced (suppressed) by the vibration (resonance) of the elastic body 4 with the weight 5 if the vibrator 2 is installed. That is, the present inventors have found that by adjusting the natural frequency of the vibrator 2 to the vibration frequency of the sound to be insulated, the effect of reducing the vibration of the installation object 9 due to the sound is increased. Thus, by adjusting the natural frequency of the vibrator 2 with the weight to the vibration frequency of the sound to be insulated, it is possible to improve sound insulation performance for the sound from the source by the installation object 9.

Describing the above-described tubular member 3 more specifically, in some embodiments, as shown in FIGS. 2 to 6, the tubular member 3 may have a shape in which its axis 1 is straight. Thus, it is possible to prevent the tubular member 3 from being twisted or the like. Therefore, it is possible to prevent occurrence of the vibration mode due to the above-described twist or the like with respect to the elastic body 4 on which the weight 5 is installed, and it is possible to prevent occurrence of resonance at a nearby vibration frequency which is different from the natural frequency of the elastic body 4 with the weight 5 adjusted to the vibration frequency of the sound to be insulated.

Further, in some embodiments, as shown in FIGS. 2 to 6, the cross section of the above-described tubular member 3 (the cross-sectional shape of the tubular wall 31) may have a point-symmetrical shape centered on a position of the axis 1 located at the center of the cross section. In this case, the shape of the cross section of the tubular wall 31 may have a point-symmetrical and line-symmetrical shape such as a circle (annular shape), a polygon (regular polygon), or an ellipse. The polygon may be, for example, a triangle or a quadrangle such as a square or a rectangle, or may have more angles. Thus, when the installation object 9 vibrates, the vibrator 2 is not twisted, it is possible to make the vibration mode other than the vibration mode where the elastic body 4 on which the weight 5 is installed moves up and down less likely to occur, and it is possible to facilitate tuning of the natural frequency of the vibrator 2.

Figure 3:
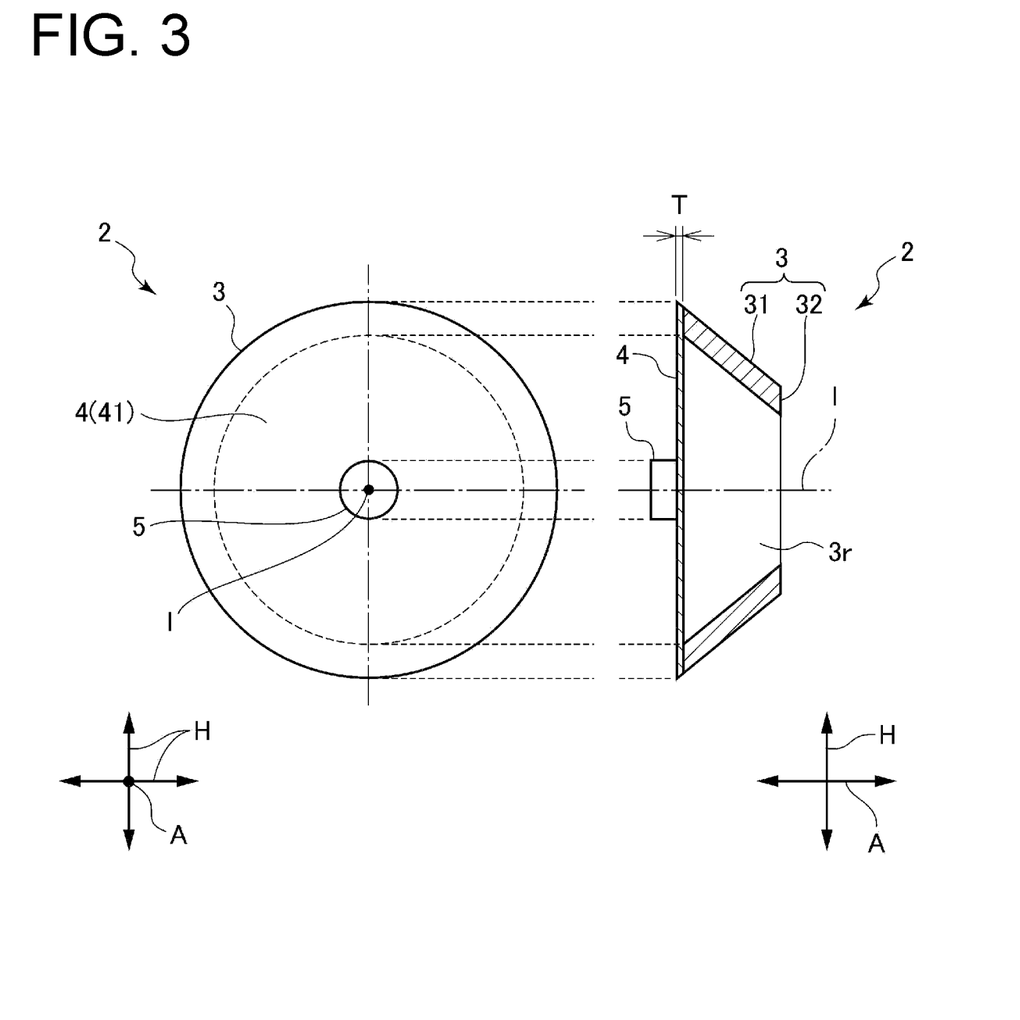
FIG. 3 shows schematic configuration views of the vibrator according to at least one embodiment of the present disclosure, where a tubular member has a trapezoidal cross section along an axis.
Figure 4:
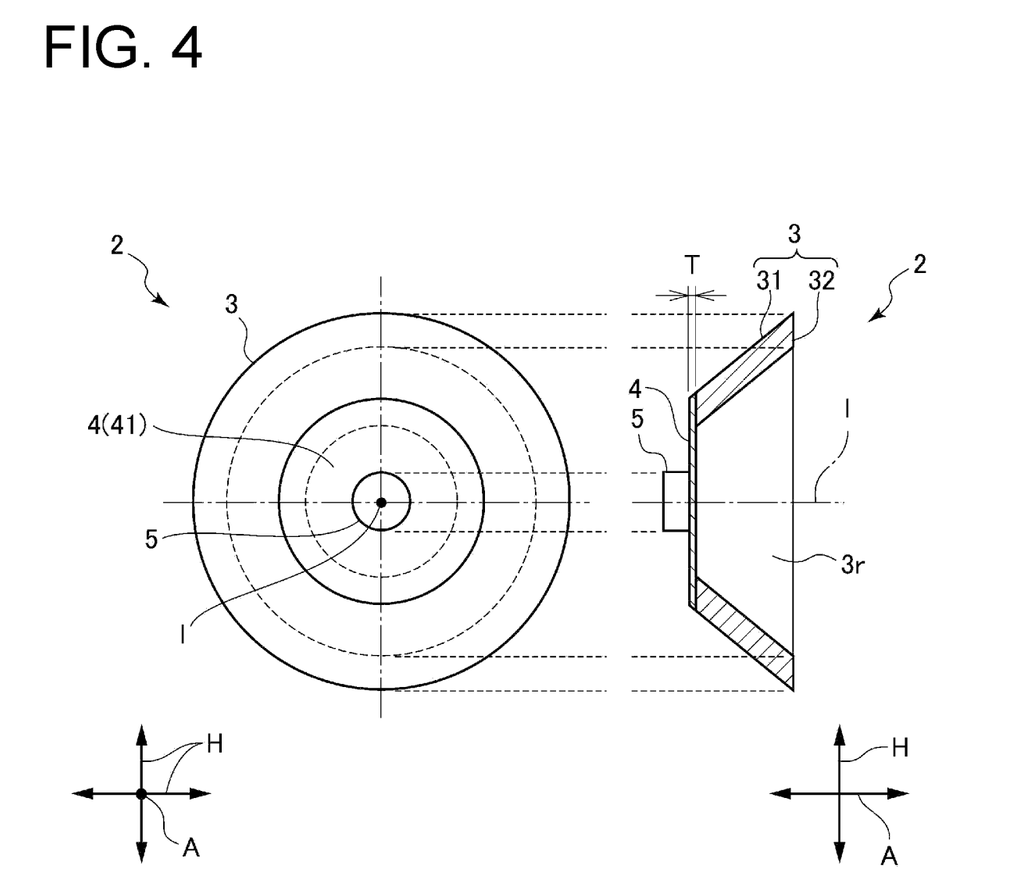
FIG. 4 shows schematic configuration views of the vibrator according to at least one embodiment of the present disclosure, where the tubular member has a reverse trapezoidal cross section along the axis from FIG. 3.

In some embodiments, the cross-sectional area of the tubular member 3 may be constant along the axis direction A (see the right side in FIGS. 2, 5, and 6), or may not be constant along the axis direction A but may increase or decrease along one side of the axis direction A (see the right side in FIGS. 3 and 4). In the embodiments shown in FIGS. 3 and 4, as shown on the right side in each view, the cross-sectional shape of the tubular member 3 along the axis 1 (axis direction A) is a trapezoid (isosceles trapezoid). In the embodiment shown in FIG. 3, as shown on the right side, the end portion of the tubular member 3 installed on the installation object 9 has a smaller diameter than the end portion where the elastic body 4 is installed. Conversely, in the embodiment shown in FIG. 4, as shown on the right side, the end portion of the tubular member 3 installed on the installation object 9 has a larger diameter than the end portion where the elastic body 4 is installed.

Thus, it is possible to adjust the region (installation area) of the installation object 9 overlapping the tubular member 3 to be small or large, and it is possible to further increase the degree of freedom in installing the vibrator 2 on the installation object 9. Further, it is possible to adjust the area of the elastic body 4 being supported by the tubular member 3, and it is possible to further increase the degree of freedom in adjusting the natural frequency of the elastic body 4.

An end portion side (installation side end portion) of the tubular member 3 installed on the installation object 9 may be open or may be closed with, for example, the same material as the tubular wall 31. In FIGS. 2 to 6, the installation side end portion is open to further reduce the weight of the vibrator 2. If the installation side end portion is closed, it is possible to achieve firmer fixing by, for example, a case where the tubular member 3 is adhered to the installation object 9.

As will be described later, the above-described elastic body 4 may be, for example, an elastically deformable thin plate 41 (film), or may be formed of a plurality of elastically deformable wire members 42. Further, the elastic body 4 has the thickness T (a film thickness along the axis direction A or a thickness of the wire member 42) which is elastically deformed by the sound to be insulated, and the thickness T may be not greater than 1 mm such as 0.5 mm. Furthermore, the elastic body 4 may be supported by the end portion of the tubular member 3 or may be supported by the tubular member 3 between both end portions of the tubular member 3 (the inner side of the tubular wall 31).

As shown in FIGS. 2 to 6, the above-described weight 5 may be installed on the elastic body 4 so as to overlap the axis 1 of the tubular member 3. In other words, the weight 5 may be installed on the elastic body 4 such that the axis 1 passes through the outer shape of the weight 5 having a certain outer shape or the inner side of the outer shape. For example, the weight 5 may be set on the elastic body such that the axis 1 passes through the center of gravity of the weight 5. Further, although illustration is omitted, the weight 5 may be a set of a plurality of weight members. In this case, the axis 1 passes through the inner side of an outer shape formed by connecting partial shapes of each weight member located on the outermost side in the set of the plurality of weight members. For example, if the weight 5 is composed of the plurality of weight members such as three weight members, the axis line 1 may pass through an inner space surrounded by the plurality of weight members, and in this case as well, the weight 5 is installed so as to overlap the axis 1. Thus, when the installation object 9 vibrates, the vibrator 2 is not twisted, it is possible to make the vibration mode other than the vibration mode where the elastic body 4 on which the weight 5 is installed moves up and down less likely to occur, and it is possible to facilitate tuning of the natural frequency of the vibrator 2.

Further, the weight 5 is installed on at least one of the surfaces of the elastic body 4. The weight 5 may be installed by, for example, being adhered to the elastic body 4. For example, as shown in FIGS. 2 to 6, the weight 5 may be installed only on the upper surface of the elastic body 4. Alternatively, although illustration is omitted, the weight 5 may be installed only on the lower surface of the elastic body 4. For example, if the weight 5 includes the plurality of weight members, the weight members may be installed on both the upper surface and the lower surface of the elastic body 4. In this case, the weight member on the upper surface side and the weight member on the lower surface side may magnetically be attached.

In the embodiments shown in FIGS. 1 to 6, the tubular member 3 has the circular cross section and the shape in which the axis 1 of the tubular member 3 is straight. The peripheral edge of the elastic body 4 is fixed at the end portion (end surface 32) of the tubular member 3, and the elastic body 4 is supported by the tubular member 3 such that one surface (facing surface) of the elastic body 4 faces the hollow portion 3r of the tubular member 3. Further, the weight 5 is composed of one weight member, and is installed in the center of the surface opposite to the opposing surface of the elastic body 4. The vibrator 2 is installed on the installation object 9 by fixing the installation side end portion of the tubular member 3 to the installation object 9 with, for example, an adhesive agent.

With the above configuration, the vibrator 2 composing the vibration damping and sound insulating device 1 includes the elastic body 4 which is supported by the hollow tubular member 3 installed on the installation object 9 and is, for example, the set of the thin plates 41 (thin films), the wire members 42, or the like on which the weight 5 is installed. Thus, it is possible to more effectively suppress the vibration near the natural frequency of the elastic body 4 with the weight 5 described above which is caused in the installation object 9 by the sound from the sound source, and it is possible to improve the sound insulation performance by the installation object 9 for the sound. Therefore, for example, by adjusting the natural frequency of the elastic body 4 with the weight 5 to low-frequency sound, it is possible to further improve the sound insulation performance for the sound in the low-frequency range. Further, the vibrator 2 is small relative to the installation object 9, and by making the tubular member 3 of the vibrator 2 hollow, it is possible to achieve weight saving as compared with the case where the tubular member 3 of the vibrator 2 is solid. Thus, it is possible to improve the sound insulation performance by the installation object 9 while suppressing the increase in weight of the installation object 9 due to the installation of the vibration damping and sound insulating device 1.

Herein, as shown in FIG. 1, the plurality of vibrators 2 described above are usually installed on the installation object 9, thereby obtaining a higher sound insulation effect. That is, as shown in FIG. 1, the vibration damping and sound insulating device 1 includes the plurality of vibrators 2 arranged at a prescribed spacing. However, the present inventors have found that an appropriate reduction effect cannot be obtained by just blindly disposing the plurality of vibrators 2 described above, and further found through an experiment or a numerical analysis that the appropriate reduction effect can be obtained by installing the vibrators 2 at positions corresponding to antinodes of a bending wave generated in the installation object 9, respectively.

Thus, in some embodiments, as shown in FIG. 1, the plurality of vibrators 2 of the vibration damping and sound insulating device 1 are arranged at a prescribed spacing L which is determined based on a half-end-length spacing of a wavelength of the bending wave generated in the installation object 9. More specifically, the prescribed spacing L is $L=\sqrt{[\pi/(\alpha f)\sqrt{\{t^2 E/(t^2 E(1-v^2)\rho)\}}]}$, where t is a thickness (board thickness) of the installation object 9, E is a Young's modulus of the installation object 9, v is a Poisson's ratio of the installation object 9, $\rho$ is a density of the installation object 9, $\alpha$ is a constant of not less than 2, and f is a frequency to be sound-insulated.

The tubular member 3 has a diameter shorter than the prescribed spacing L and has a compact shape, so that the vibrators 2 are installed on the installation object 9 at the prescribed spacing L described above.

With the above configuration, the vibration damping and sound insulating device 1 includes the plurality of vibrators 2. The plurality of vibrators 2 are installed on the installation object 9 to respectively be located at the antinodes of the bending wave, such as the half-wavelength spacing of the wavelength of the bending wave generated in the installation object 9 (a transverse wave propagating through the installation object 9). Thus, it is possible to more effectively perform vibration damping on the installation object 9, and it is possible to improve the sound insulation performance by the installation object.

Next, some embodiments related to the above-described elastic body 4 will be described.

In some embodiments, as shown in FIGS. 2 to 5, the elastic body 4 may be the thin plate 41 (thin film). In this case, the peripheral edge of the thin plate 41 is supported by the tubular member 3. More specifically, the peripheral edge of the thin plate 41 may be supported by the end portion such as the end surface 32 of the tubular member 3. That is, at least a part of the peripheral edge of the thin plate 41 extends onto the end surface 32, and the peripheral edge and the end surface 32 may be fixed by, for example, an adhesive agent or a fixation tool. Further, at least a part of the peripheral edge of the thin plate 41 extends beyond the end surface 32, is folded back toward the tubular wall 31 on the outer side of the end surface 32, and may be fixed to the tubular wall 31 (outer circumferential surface side) at the place where at least a part of the peripheral edge of the thin plate 41 is folded. Furthermore, in this case, the peripheral edge of the thin plate 41 may be supported by both the tubular wall 31 and the end portion.

Alternatively, the peripheral edge of the thin plate 41 may be supported on an inner wall surface of the tubular member 3 or may be supported in the tubular wall 31 of the tubular member 3. As for the latter, when the tubular member 3 is formed by fixing two cylindrical members, it is conceivable to sandwich the thin plate 41 therebetween. In this case, at least a part of the peripheral edge of the thin film extends beyond end surfaces (facing surfaces) of the two cylindrical members facing each other, whereby the thin film may be fixed to the outer circumferential surface side of the tubular member 3 in the same manner as described above or may further be fixed on the facing surfaces.

Figure 5:
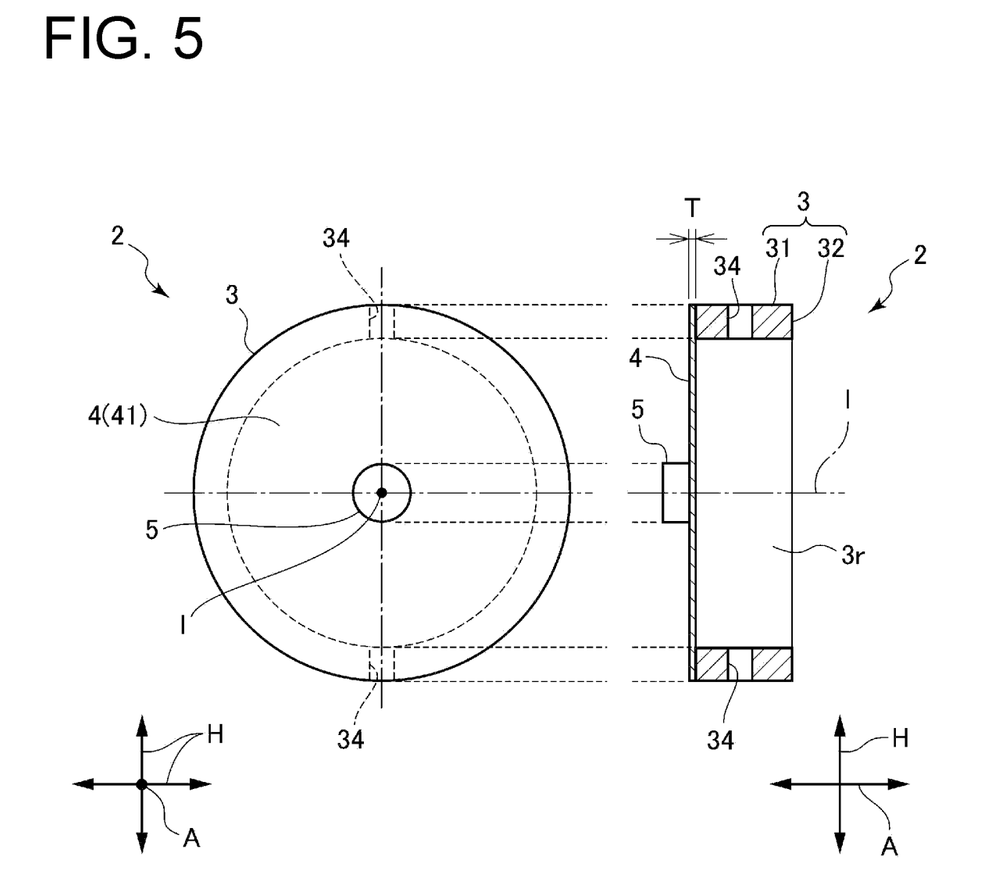
FIG. 5 shows schematic configuration views of the vibrator according to at least one embodiment of the present disclosure, where the tubular member includes communication holes.

Further, in the present embodiment, in some embodiments, as shown in FIG. 5, the above-described tubular member 3 may include a communication hole 34 through which the hollow portion 3r communicates with the outside. The communication hole 34 is formed so as to penetrate the tubular wall 31. At least one communication hole 34 will suffice. In the embodiment shown in FIG. 5, the tubular member 3 includes two communication holes 34. Further, although the two communication holes 34 are formed at opposing positions across the axis 1, the plurality of communication holes 34 can be disposed at any positions and need not be disposed at the opposing positions.

With the above configuration, the elastic body 4 is the thin plate 41 (thin film). Thus, it is possible to appropriately perform vibration damping on the installation object 9. Further, if the tubular member 3 includes the communication hole 34, it is possible to add, to the elastic body 4, damping by air entering and exiting the communication hole 34 when the elastic body 4 on which the weight 5 is installed vibrates.

Figure 6:
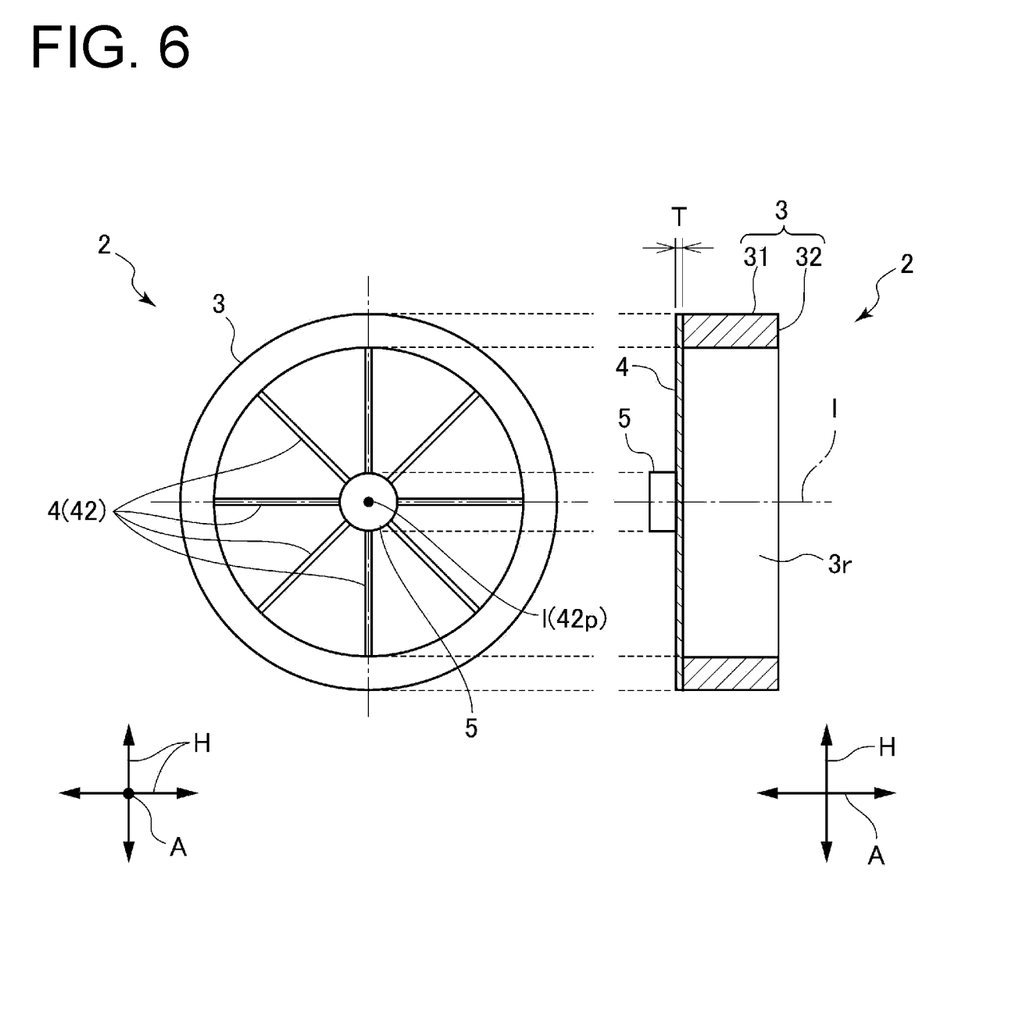
FIG. 6 shows schematic configuration views of the vibrator according to at least one embodiment of the present disclosure, where the elastic body includes a plurality of wire members.

In some other embodiments, as shown in FIG. 6, the elastic body 4 may be formed of the plurality of wire members 42 each of which is supported at both ends by the tubular member 3. In this case, each of the plurality of wire members 42 described above has an intersection point 42p with the other wire members 42 forming the elastic body 4 as well. The plurality of wire members 42 having the intersection point 42p can serve as a base for supporting the weight 5. Further, the both ends of each wire member 42 can be fixed to either the end surface 32, the inner wall surface, or an outer wall surface of the tubular member 3. The manner of fixing may be the same as in the case where the elastic body 4 is the thin plate 41, and the details of which will be omitted.

In the embodiment shown in FIG. 6, the elastic body 4 is formed of four linear wire members 42, and is supported by the tubular member 3 such that the four wire members 42 intersect each other at a position where the axis 1 passes. The weight 5 is installed on the elastic body 4 such that the center of gravity of the weight 5 is located at the intersection point 42p. Thereby, the weight 5 is disposed such that one intersection point 42p and a part of each wire member 42 overlap. Further, the four wire members 42 are installed on the tubular member 3 at spacings of 45 degrees, whereby the vibration mode other than the vibration mode where the elastic body 4 on which the weight 5 is installed moves up and down is unlikely to occur.

However, the present invention is not limited to the present embodiment. The plurality of wire members 42 may be installed such that the intersection point 42p is positioned so as to surround the position of the axis 1. For example, if a star shape is drawn by five wire members 42, a total of five intersection points 42*p* are disposed at corners of the pentagon. Thereby, the weight 5 is disposed such that the five intersection points 42*p* and a part of each wire member 42 including a portion located between the five intersection points 42*p* overlap.

With the above configuration, the elastic body 4 is formed of the plurality of wire members 42, and each wire member 42 is installed so as to have the intersection point 42*p* with the other wire members 42. Thus, it is possible to appropriately perform vibration damping on the installation object 9.

The present invention is not limited to the above-described embodiments, and also includes an embodiment obtained by modifying the above-described embodiments and an embodiment obtained by combining these embodiments as appropriate.

APPENDIX (1) A vibration damping and sound insulating device (1) according to at least one embodiment of the present invention is a vibration damping and sound insulating device (1) installed on an installation object (9), which includes at least one vibrator (2). The vibrator (2) includes: a cylindrical tubular member (3) installed on the installation object (9); an elastic body (4) supported by the tubular member (3) so as to traverse a hollow portion (3*r*) of the tubular member (3) along an orthogonal direction (H) orthogonal to an axis (1) of the tubular member (3); and a weight (5) installed on the elastic body (4).

With the above configuration (1), the vibrator (2) composing the vibration damping and sound insulating device (1) includes the elastic body (4) which is supported by the hollow tubular member (3) installed on the installation object (9) and is, for example, the set of the thin plates (41) (thin films), the wire members (42), or the like on which the weight (5) is installed. Thus, it is possible to more effectively suppress the vibration near the natural frequency of the elastic body (4) with the weight (5) described above which is caused in the installation object (9) by the sound from the sound source, and it is possible to improve the sound insulation performance by the installation object (9) 9 for the sound. Therefore, for example, by adjusting the natural frequency of the elastic body (4) with the weight (5) to low-frequency sound, it is possible to further improve the sound insulation performance for the sound in the low-frequency range. Further, the vibrator (2) is small relative to the installation object (9), and by making the tubular member (3) of the vibrator (2) hollow, it is possible to achieve weight saving as compared with the case where the tubular member (3) of the vibrator (2) is solid. Thus, it is possible to improve the sound insulation performance by the installation object (9) while suppressing the increase in weight of the installation object (9) due to the installation of the vibration damping and sound insulating device (1).

(2) In some embodiments, in the above configuration (1), the tubular member (3) has higher rigidity than the elastic body (4).

With the above configuration (2), the tubular member (3) is configured so as not to elastically be deformed by incident sound or applied vibration. Thus, it is possible to appropriately transmit the vibration of the installation object (9) to the elastic body (4) with the weight (5).

(3) In some embodiments, in the above configurations (1) and (2), the elastic body (4) on which the weight (5) is installed has a natural frequency adjusted to a vibration frequency of sound to be insulated.

With the above configuration (3), the natural frequency of the elastic body (4) with the weight (5) is adjusted to a vibration frequency in a range that resonates with the vibration frequency of the sound to be insulated. The present inventors have found that by adjusting the natural frequency of the vibrator (2), for example, so as to coincide with the vibration frequency of the sound to be insulated, the effect of reducing the vibration of the installation object (9) due to the sound is increased. Thus, by adjusting the natural frequency of the vibrator (2) with the weight (5) to the vibration frequency of the sound to be insulated, it is possible to improve sound insulation performance for the sound from the source by the installation object (9).

(4) In some embodiments, in the above configurations (1) to (3), the vibration damping and sound insulating device (1) includes a plurality of the vibrators (2) arranged at a prescribed spacing (L). The prescribed spacing (L) is determined based on a half-end-length spacing of a wavelength of a bending wave generated in the installation object (9).

With the above configuration (4), the vibration damping and sound insulating device (1) includes the plurality of vibrators (2). The plurality of vibrators (2) are installed on the installation object (9) to respectively be located at the antinodes of the bending wave, such as the half-wavelength spacing of the wavelength of the bending wave generated in the installation object (9) (a transverse wave propagating through the installation object (9)). The present inventors have found that an appropriate reduction effect cannot be obtained by just blindly disposing the vibrators (2) each having the appropriate natural frequency, and the appropriate reduction effect can be obtained by the above-described installation. By disposing the plurality of vibrators (2) on the installation object (9) as described above, it is possible to more effectively perform vibration damping on the installation object (9), and it is possible to improve the sound insulation performance by the installation object (9).

(5) In some embodiments, in the above configurations (1) to (4), the elastic body (4) is a thin plate (41) supported at a peripheral edge by the tubular member (3).

With the above configuration (5), the elastic body (4) is the thin plate (41) (thin film). Thus, it is possible to appropriately perform vibration damping on the installation object (9).

(6) In some embodiments, in the above configuration (5), the tubular member (3) includes a communication hole (34) through which the hollow portion (3*r*) communicates with outside.

With the above configuration (6), the tubular member (3) includes at least one communication hole (34). Thus, it is possible to add, to the elastic body (4), damping by air entering and exiting the communication hole (34) when the elastic body (4) on which the weight (5) is installed vibrates.

(7) In some embodiments, in the above configurations (1) to (4), the elastic body (4) is formed of a plurality of wire members (42) each of which is supported at both ends by the tubular member (3), and each of the plurality of wire members (42) has an intersection point (42*p*) with the other wire members (42).

With the above configuration (7), the elastic body (4) is formed of the plurality of wire members (42), and each wire member (42) is installed so as to have the intersection point (42*p*) with the other wire members (42). Thus, it is possible to appropriately perform vibration damping on the installation object (9).

(8) In some embodiments, in the above configurations (1) to (7), a cross section of the tubular member (3) along the orthogonal direction (H) has a point-symmetrical shape centered on a position of the axis (1) of the tubular member (3).

With the above configuration (8), the cross-sectional shape of the tubular member (3) has a point-symmetrical shape with any position of the axis (1) of the tubular member (3) as a point of symmetry, for example, a circle, a quadrangle, or a regular polygon. Thus, when the installation object (9) vibrates, the vibrator (2) is not twisted, it is possible to make the vibration mode other than the vibration mode where the elastic body (4) on which the weight (5) is installed moves up and down less likely to occur, and it is possible to facilitate tuning of the natural frequency of the vibrator (2).

(9) In some embodiments, in the above configurations (1) to (8), the tubular member (3) has a trapezoidal cross-sectional shape along the axis (1).

With the above configuration (9), it is possible to adjust the region (installation area) of the installation object (9) overlapping the tubular member (3) to be small or large, and it is possible to further increase the degree of freedom in installing the vibrator (2) on the installation object (9). Further, it is possible to adjust the area of the elastic body (4) being supported by the tubular member (3), and it is possible to further increase the degree of freedom in adjusting the natural frequency of the elastic body (4).

(10) In some embodiments, in the above configurations (1) to (9), the weight (5) is installed on the elastic body (4) so as to overlap the axis (1) of the tubular member (3).

With the above configuration (10), the elastic body (4) is installed so as to overlap the axis (1) of the tubular member (3), for example, the center of gravity of the weight (5) is on the axis (1) of the tubular member (3). Thus, when the installation object (9) vibrates, the vibrator (2) is not twisted, it is possible to make the vibration mode other than the vibration mode where the elastic body (4) on which the weight (5) is installed moves up and down less likely to occur, and it is possible to facilitate tuning of the natural frequency of the vibrator (2).

REFERENCE SIGNS LIST

1 Sound insulating device
2 Vibrator
3 Tubular member
3r Hollow portion
31 Tubular wall
32 End surface
34 Communication hole
4 Elastic body
41 Thin plate
42 Wire member
42p Intersection point
5 Weight
9 Installation object
A Axis direction
H Orthogonal direction
I Axis
L Prescribed spacing
T Thickness of elastic body

The invention claimed is:

1. A vibration damping and sound insulating device installed on an installation object, comprising:
vibrators disposed at a prescribed spacing,
wherein each of the vibrators comprises:
a cylindrical tubular member on the installation object;
an elastic body supported by the cylindrical tubular member such that the elastic body traverses a hollow portion of the cylindrical tubular member along a direction orthogonal to an axis of the cylindrical tubular member; and
a weight on the elastic body, and
wherein the elastic body is a thin plate supported at a peripheral edge by the cylindrical tubular member,
wherein the cylindrical tubular member has a communication hole through which the hollow portion communicates with a space outside of the cylindrical tubular member, and
wherein the space is defined between adjacent ones of the vibrators.

2. The vibration damping and sound insulating device according to claim 1, wherein the cylindrical tubular member has higher rigidity than the elastic body.

3. The vibration damping and sound insulating device according to claim 1, wherein the elastic body has a natural frequency adjusted to a vibration frequency of sound to be insulated.

4. The vibration damping and sound insulating device according to claim 1, wherein a cross section of the cylindrical tubular member along the direction has a point-symmetrical shape centered at a position of the axis of the cylindrical tubular member.

5. The vibration damping and sound insulating device according to claim 1, wherein the cylindrical tubular member has a trapezoidal cross-sectional shape along the axis.

6. The vibration damping and sound insulating device according to claim 1, wherein the weight overlaps the axis of the cylindrical tubular member.

7. The vibration damping and sound insulating device according to claim 1, wherein the prescribed spacing is determined based on a half-wavelength spacing of a wavelength of a bending wave generated in the installation object.

8. A vibration damping and sound insulating device installed on an installation object, comprising:
vibrators disposed at a prescribed spacing,
wherein each of the vibrators comprises:
a cylindrical tubular member on the installation object;
an elastic body supported by the cylindrical tubular member such that the elastic body traverses a hollow portion of the cylindrical tubular member along a direction orthogonal to an axis of the cylindrical tubular member; and
a weight on the elastic body,
wherein a cross section of the cylindrical tubular member along the direction has a circular shape centered on the axis,
wherein the elastic body is formed of wire members each of which is supported at both ends by the cylindrical tubular member, and
wherein each of the wire members has an intersection point with remaining wire members at a position where the axis of the cylindrical tubular member passes.

9. A vibration damping and sound insulating device installed on an installation object, comprising:
vibrators disposed at a prescribed spacing,
wherein each of the vibrators comprises:
a cylindrical tubular member on the installation object;
an elastic body supported by the cylindrical tubular member such that the elastic body traverses a hollow portion of the cylindrical tubular member along a direction orthogonal to an axis of the cylindrical tubular member; and
a weight on the elastic body, wherein the cylindrical tubular member has a trapezoidal cross-sectional shape along the axis, and wherein the trapezoidal cross-sectional shape has a larger diameter at an end portion of the cylindrical tubular member where the elastic body is installed than at an end portion of the cylindrical tubular member that is installed on the installation object.

\* \* \* \* \*